(12) United States Patent
Waksmundzki

(10) Patent No.: US 8,157,693 B2
(45) Date of Patent: Apr. 17, 2012

(54) HELICAL DIFFERENTIAL ASSEMBLY WITH PRELOADED ADJUSTMENT MECHANISM

(75) Inventor: Frank Waksmundzki, Farmington Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 241 days.

(21) Appl. No.: 12/710,658

(22) Filed: Feb. 23, 2010

(65) Prior Publication Data

US 2010/0151982 A1 Jun. 17, 2010

Related U.S. Application Data

(63) Continuation-in-part of application No. 11/820,273, filed on Jun. 19, 2007, now Pat. No. 7,682,280.

(51) Int. Cl.
*F16H 48/06* (2006.01)

(52) U.S. Cl. .......................................... 475/248

(58) Field of Classification Search .................. 475/248, 475/249
See application file for complete search history.

(56) References Cited

U.S. PATENT DOCUMENTS

| | | |
|---|---|---|
| 1,365,841 A | 1/1921 | Mellenthin |
| 1,506,438 A | 8/1924 | Monday |
| 1,883,725 A | 10/1932 | Guilmette |
| 2,209,966 A | 8/1940 | Goeller |
| 2,234,591 A | 3/1941 | Fitzner |
| 2,354,214 A | 7/1944 | Lockwood |
| 3,261,230 A | 7/1966 | Rudnicki |
| 3,323,844 A | 6/1967 | Hedstrom |
| 3,364,792 A | 1/1968 | Roach |
| 3,397,595 A | 8/1968 | Roach |
| 3,448,635 A | 6/1969 | Nelson |
| 3,528,323 A | 9/1970 | Kamlukin |
| 3,848,482 A | 11/1974 | Shank |
| 3,974,717 A | 8/1976 | Breed et al. |
| 4,223,570 A | 9/1980 | Yamamori et al. |
| 4,495,835 A | 1/1985 | Gleasman |
| 4,583,424 A | 4/1986 | von Hiddessen et al. |
| 4,612,825 A | 9/1986 | Engle |
| 5,139,467 A | 8/1992 | Carpenter |
| 5,183,446 A | 2/1993 | Hughes et al. |
| 5,186,079 A | 2/1993 | Gee |
| 5,415,601 A * | 5/1995 | Cilano ........................ 475/160 |
| 5,556,344 A | 9/1996 | Fox |

(Continued)

FOREIGN PATENT DOCUMENTS

JP  07-243508  9/1995

(Continued)

*Primary Examiner* — David D Le
*Assistant Examiner* — Erin D Bishop
(74) *Attorney, Agent, or Firm* — Harness, Dickey & Pierce, P.L.C.

(57) ABSTRACT

A vehicle differential assembly includes a differential housing rotatable about an axis. A first output assembly includes a first side gear positioned within the differential housing and a first output member coupled to the first side gear and having an aperture aligned with the axis. A second output assembly includes a second side gear positioned within the differential housing and a second output member coupled for rotation with the second side gear. A first helical pinion gear is meshingly engaged with the first side gear. A second helical pinion gear is meshingly engaged with the second side gear and the first helical pinion gear. A first coupling assembly includes a coupling mechanism disposed in the aperture and a biasing member engaged with the coupling mechanism to bias the first output assembly into frictional engagement with the differential housing.

31 Claims, 4 Drawing Sheets

U.S. PATENT DOCUMENTS

| | | |
|---|---|---|
| 5,647,814 A | 7/1997 | Krisher |
| 5,671,640 A | 9/1997 | Valente |
| 5,897,452 A | 4/1999 | Schreier et al. |
| 5,984,822 A | 11/1999 | Schreier et al. |
| 6,013,004 A | 1/2000 | Gage et al. |
| 6,015,362 A | 1/2000 | Irikura et al. |
| 6,190,281 B1 | 2/2001 | Oates |
| 6,210,299 B1 | 4/2001 | Yoshioka |
| 6,325,737 B1 | 12/2001 | Zinke, II et al. |
| 6,327,934 B1 | 12/2001 | Barthel |
| 6,364,803 B1 | 4/2002 | Barnholt et al. |
| 6,814,683 B2 | 11/2004 | Krzesicki et al. |
| 6,849,021 B2 | 2/2005 | Krzesicki et al. |
| 2006/0073901 A1 | 4/2006 | Bommarito |

FOREIGN PATENT DOCUMENTS

| | | |
|---|---|---|
| JP | 2000-274513 | 10/2000 |
| JP | 2001-141031 | 5/2001 |

* cited by examiner

HELICAL DIFFERENTIAL ASSEMBLY WITH PRELOADED ADJUSTMENT MECHANISM

CROSS-REFERENCE TO RELATED APPLICATIONS

This application is a continuation-in-part of U.S. patent application Ser. No. 11/820,273 filed on Jun. 19, 2007 (now U.S. Pat. No. 7,682,280). The entire disclosure of the above application is incorporated herein by reference.

FIELD

The present disclosure relates to differentials for use in automotive drivelines, and more specifically to limited slip differentials.

BACKGROUND

The statements in this section merely provide background information related to the present disclosure and may not constitute prior art.

Differential assemblies provide for speed differentiation between a pair of driven wheels. Typically, a differential assembly includes a differential housing rotatably driven about an axis by a ring gear that is fixed thereto. The differential assembly may include mated pairs of side gears and pinion gears rotatably supported within the differential housing. Output shafts extend within the differential housing. Each output shaft includes an end fixed for rotation with one of the side gears.

Limited slip differential assemblies operate to provide at least some output torque to each output shaft regardless of the coefficient of friction between the driven wheels and the ground. At least one limited slip differential assembly includes a side gear frictionally engaged with the differential housing. The frictional engagement may be provided by a spring applying a predetermined engagement force. The predetermined engagement force is not adjustable.

SUMMARY

A vehicle differential assembly may include a differential housing rotatable about an axis, first and second output assemblies, a pinion gear, and a first coupling assembly. The first output assembly may include a first side gear and a first output member. The first side gear may be disposed within the differential housing and may be rotatable about the axis. The first output member may be coupled to the first side gear for rotation therewith. The second output assembly may include a second side gear and a second output member. The second side gear may be disposed within the differential housing and may be rotatable about the axis. The second output member may be coupled to the second side gear for rotation therewith. The pinion gear may be disposed within the differential housing and may be engaged with the first and second side gears. The first coupling assembly may be engaged with the first output assembly and may include a coupling mechanism and a biasing member. The coupling mechanism may extend through an opening in the first output member and may be displaceable relative to the differential housing in a direction generally parallel to the axis. The biasing member may be engaged with the coupling mechanism and may urge the first output assembly into frictional engagement with the differential housing.

The coupling mechanism may further include an adjustment member to vary a load applied by the biasing member.

A vehicle differential assembly includes a differential housing rotatable about an axis. A first output assembly includes a first side gear positioned within the differential housing and a first output member coupled to the first side gear and having an aperture aligned with the axis. A second output assembly includes a second side gear positioned within the differential housing and a second output member coupled to the second side gear for rotation therewith. A first helical pinion gear is meshingly engaged with the first side gear. A second helical pinion gear is meshingly engaged with the second side gear and the first helical pinion gear. A first coupling assembly includes a biasing member biasing the first output assembly into frictional engagement with the differential housing and a coupling mechanism disposed in the aperture and including an adjustment member that is displaceable relative to the first output member to vary a load applied by the biasing member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. While the following description is directed to a bevel gear differential assembly, it is understood that the description applies equally to helical gear differential assemblies.

Figure 1:
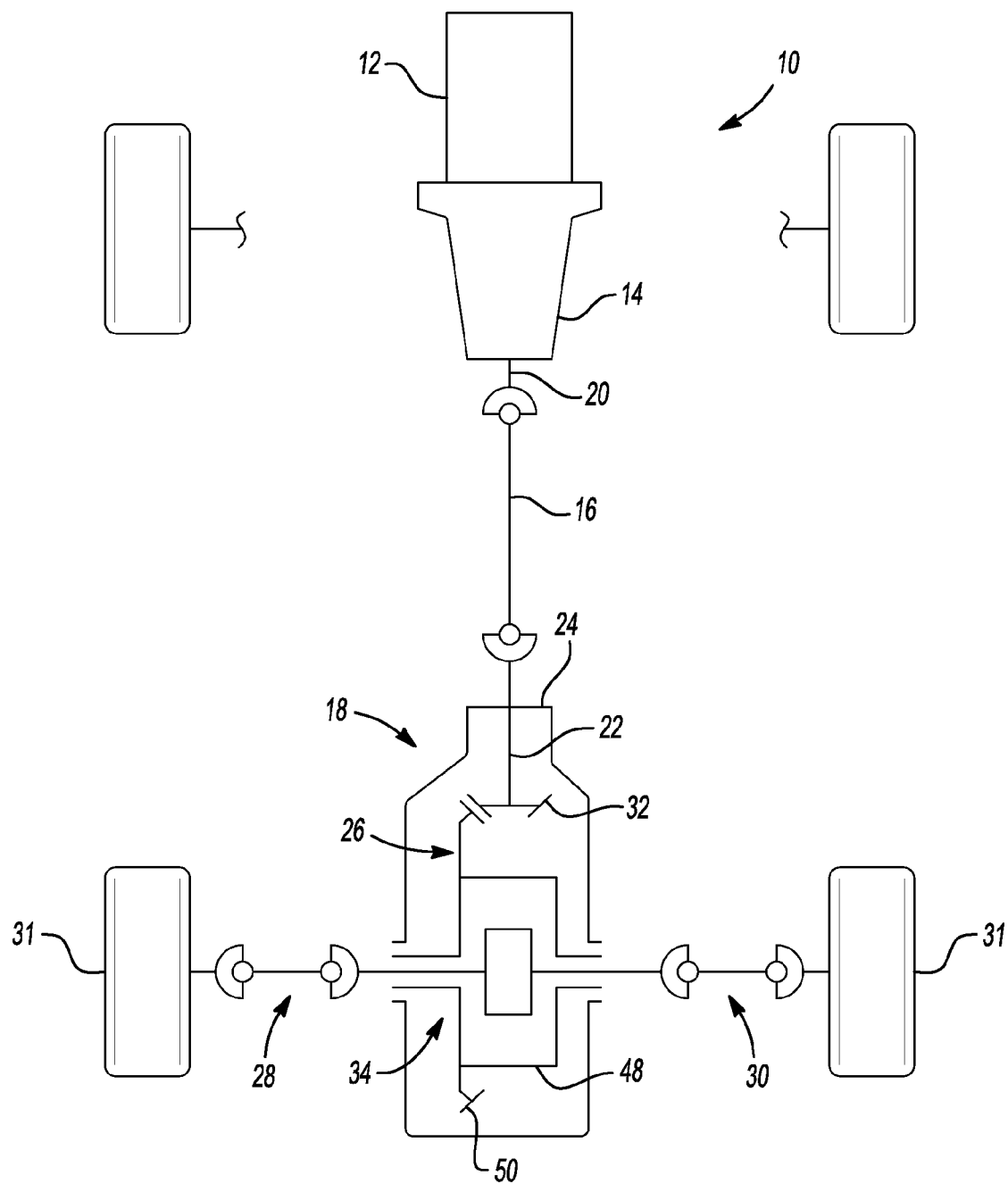
FIG. 1 is a schematic illustration of a vehicle according to the present disclosure.

With reference to FIG. 1, a vehicle 10 may include an engine 12, a transmission 14, a propeller shaft 16, and a rear axle assembly 18. Transmission 14 may include an output shaft 20 engaged with propeller shaft 16. Propeller shaft 16 may be engaged with rear axle assembly 18. Rear axle assembly 18 may include a pinion shaft 22, a differential carrier 24, a differential assembly 26, and first and second axle shafts 28, 30 drivingly coupled to wheels 31. Pinion shaft 22 may be engaged with and driven by propeller shaft 16 and may extend into differential carrier 24. Pinion shaft 22 may include a pinion gear 32 thereon engaged with differential assembly 26.

Figure 2:
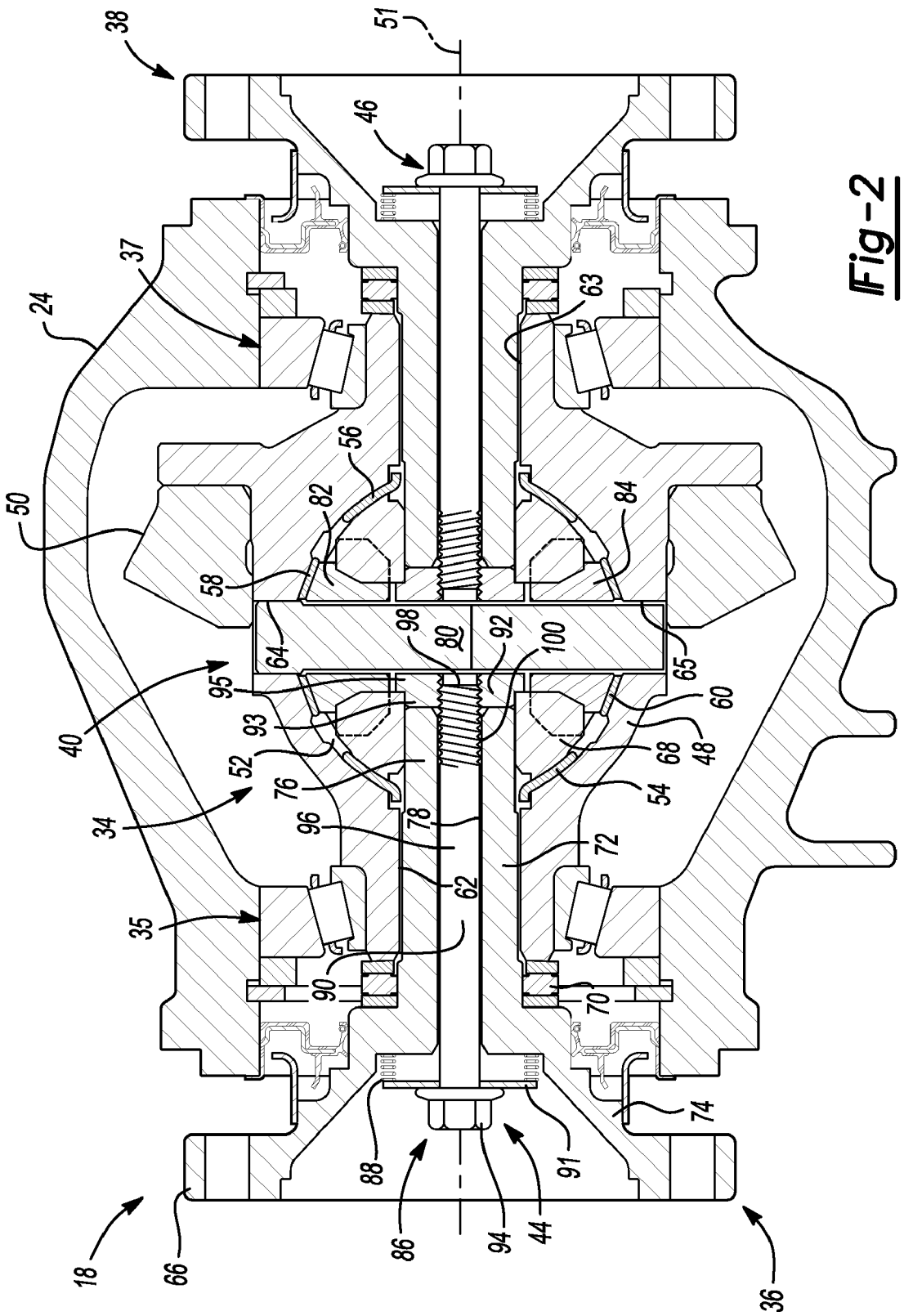
FIG. 2 is a sectional view of the rear axle assembly of FIG. 1.

With reference to FIGS. 1 and 2, differential assembly 26 may be rotatably supported within differential carrier 24 by bearing assemblies 35, 37 and may include a differential housing assembly 34, first and second output assemblies 36, 38, a pinion assembly 40, and first and second coupling assemblies 44, 46. Differential housing assembly 34 may include a differential housing 48 and a ring gear 50 rotatable about an axis 51. Ring gear 50 may be fixed to differential housing 48. Differential housing 48 may include a body defining a central cavity 52 having a series of thrust washers 54, 56, 58, 60 therein, and first, second, third, and fourth openings 62, 63, 64, 65 extending therethrough and in communication with central cavity 52. Ring gear 50 may be meshingly engaged with and driven by pinion gear 32.

First output assembly 36 may be generally similar to second output assembly 38. Therefore, second output assembly 38 will not be described in detail with the understanding that the description of first output assembly 36 applies equally to second output assembly 38. First output assembly 36 may be frictionally engaged with differential housing 48 for rotation about axis 51. First output assembly 36 may include a first output member 66, a first side gear 68, and a first thrust bearing 70. First thrust bearing 70 may be disposed between first output member 66 and differential housing 48. First output member 66 may include an output shaft 72 having a flanged end 74.

Output shaft 72 may extend into first opening 62 in differential housing 48 and may have an end 76 opposite flanged end 74 located within cavity 52. End 76 may be splined and may have first side gear 68 in a splined engagement therewith. As a result of the splined engagement, first side gear 68 and output shaft 72 may be coupled for rotation with one another and first side gear 68 may be axially displaceable relative to output shaft 72 to provide an adjustable preload engagement between first side gear 68 and differential housing 48, as discussed below. Output shaft 72 may include an aperture 78 extending therethrough for engagement with first coupling assembly 44 to provide the adjustable preload engagement.

Pinion assembly 40 may include a pinion shaft 80, and first and second pinion gears 82, 84. Pinion shaft 80 may be disposed within third and fourth openings 64, 65. First and second pinion gears 82, 84 may be supported for rotation about pinion shaft 80 as well as axial displacement relative thereto.

First coupling assembly 44 may be generally similar to second coupling assembly 46. Therefore, second coupling assembly 46 will not be described in detail with the understanding that the description of first coupling assembly 44 applies to second coupling assembly 46. First coupling assembly 44 may include a coupling mechanism 86 and a biasing member 88. Coupling mechanism 86 may include a bolt 90, a washer 91, and a nut 92. Bolt 90 may include a head 94 having a shank 96 extending therefrom. Head 94 may extend axially outwardly from a first end of aperture 78 in output shaft 72 and a second end 98 of bolt 90 generally opposite head 94 may extend axially inwardly from first opening 62 and into cavity 52. Washer 91 may be disposed between head 94 and biasing member 88 and may be engaged with biasing member 88.

Second end 98 of bolt 90 may include a threaded portion 100 for engagement with nut 92. Nut 92 may include a generally cylindrical body having first and second portions 93, 95 at opposite ends thereof. First portion 93 may be in splined engagement with first side gear 68 and may abut end 76 of output shaft 72. Second portion 95 may form a flange extending radially outwardly relative to first portion 93. Second portion 95 of nut 92 may abut first side gear 68 and may generally urge first side gear 68 axially outwardly toward thrust washer 54. The force applied to first side gear 68 by nut 92 may generally be determined by the axial location of head 94 and the characteristics of biasing member 88.

Biasing member 88 may generally urge coupling mechanism 86, and therefore first side gear 68, axially outwardly in a direction generally parallel to axis 51. More specifically, biasing member 88 may be disposed between head 94 of bolt 90 and first opening 62 in differential housing 48. Biasing member 88 may engage head 94 and a portion of first output member 66 at an axially outer end of aperture 78. Biasing member 88 may include a compression spring having a spring rate (k) and a free length ($L_f$) that may be compressed to an installed length ($L_i$) when located between head 94 and first opening 62.

First coupling assembly 44 may be adjustable to provide a variable preload force urging first side gear 68 into engagement with thrust washer 54 and, therefore, differential housing 48. The preload force may be adjusted by varying the installed length ($L_i$) of biasing member 88. The installed length ($L_i$) of biasing member 88 may be adjusted through axial translation of bolt 90 in a direction generally parallel to axis 51. Bolt 90 may be translated axially through rotation thereof, maintaining a threaded engagement with nut 92 and changing the installed length ($L_i$) of biasing member 88. Head 94 may therefore generally form a preload adjustment member, as it may be rotated to axially translate bolt 90.

Head 94 may be located outside of differential housing 48 and may be rotated in first and second rotational directions generally opposite one another. Rotation of bolt 90 in the first rotational direction may generally increase a frictional engagement between first output assembly 36 and differential housing 48. Rotation of bolt 90 in the second rotational direction may generally decrease a frictional engagement between first output assembly 36 and differential housing 48.

For example, in a first configuration biasing member 88 may have an installed length of ($L_{i1}$) and in a second configuration biasing member 88 may have an installed length of ($L_{i2}$). The preload force urging first side gear 68 into frictional engagement with differential housing 48 may generally be defined as $F_1=(k)(L_f-L_{i1})$ for the first configuration and $F_2=(k)(L_f-L_{i2})$ for the second configuration. Assuming that $L_{i2}$ is less than $L_{i1}$, $F_2$ is greater than $F_1$. As such, the first configuration may provide a lesser resistance to relative rotation between first output assembly 36 and differential housing 48 due to a lesser frictional engagement between first output assembly 36 and differential housing 48 resulting from $F_1$ being less than $F_2$.

First and second coupling assemblies 44, 46 may generally be independent of one another. Therefore, first and second coupling assemblies 44, 46 may be adjusted independently of one another. This design flexibility allows for final assembly preload settings to be adjusted to account for manufacturing variances that may affect the torque required to turn the side gear. In one contemplated method of adjustment after assembly, pinion shaft 22 is rotated while one of the side gears 68 is restricted from rotation. At this time, the one of first coupling assembly 44 and second coupling assembly 46 that corresponds to the unrestricted side gear is adjusted until a desired torque to turn pinion shaft 22 is obtained. The procedure is repeated by restricting the other side gear and adjusting the preload via the other of first coupling assembly 44 and second coupling assembly 46 until a desired pinion shaft torque is obtained. Additionally, it should be noted that first and second coupling assemblies 44, 46 may be adjusted at locations external to differential carrier 24 and differential housing 48. As such, disassembly of the differential is not required to set a desired preload or pinion shaft torque.

Figure 3:
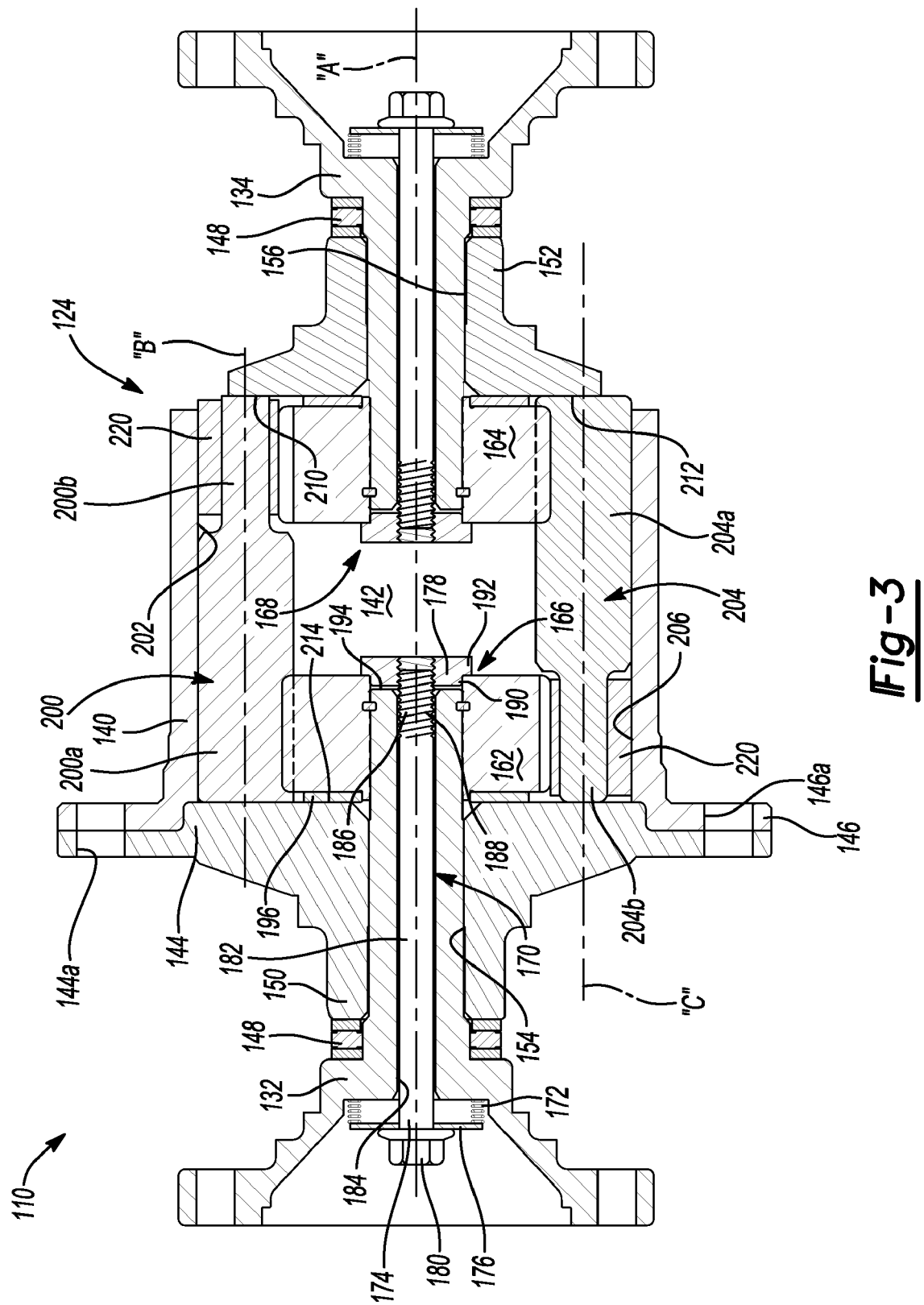
FIG. 3 is a sectional view of an alternate rear axle assembly.
Figure 4:
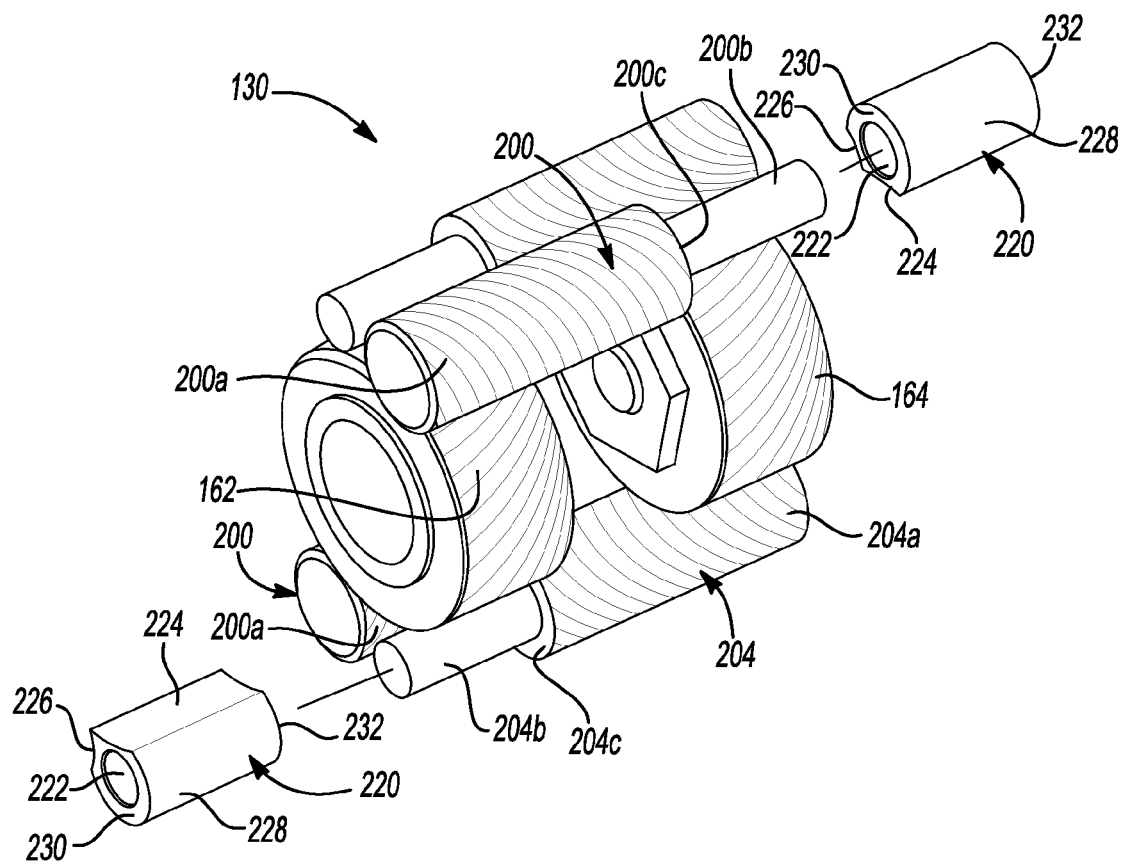
FIG. 4 is a partial exploded perspective view of a planetary gearset of the rear axle assembly shown in FIG. 3.

FIGS. 3 and 4 depict an alternate differential assembly 110 including a planetary gearset 130 which is operable for transferring drive torque from a housing assembly 124 to output shafts 132 and 134 in a manner facilitating speed differential and torque biasing therebetween. Housing assembly 124 also includes an end cap 144 which is press-fit to a radial flange segment 146 of a drum housing 140 and secured thereto such as by fasteners (not shown) extending through aligned mounting apertures 144a and 146a. Thrust bearings 148 are axially positioned between output shaft 132 and housing assembly 124 as well as output shaft 134 and housing assembly 124.

A ring gear (not shown) is fixed to radial flange segment 146 to transfer rotary power (i.e., drive torque) to housing assembly 124. Housing assembly 124 also includes tubular axle trunnions 150 and 152 which respectively define axially aligned axle openings 154 and 156 that communicate with a chamber 142. Axle trunnion 150 extends outwardly from the end cap 144 while axle trunnion 152 extends outwardly from drum housing 140. Axle openings 154 and 156 are adapted to receive and rotatably support corresponding end segments of output shafts 132 and 134 for rotation about a central rotary axis, denoted by construction line "A". Likewise, housing assembly 124 of differential 110 is rotatably supported by a carrier (not shown) for rotation about rotary axis "A".

Gearset 130 is mounted in chamber 142 and includes a pair of helical side gears 162 and 164 having internal splines that are adapted to mesh with external splines on corresponding end segments of output shafts 132 and 134.

A first coupling assembly 166 interconnects first side gear 162, housing assembly 124 and output shaft 132. First coupling assembly 166 is substantially similar to a second coupling assembly 168. Therefore, second coupling assembly 168 will not be described in detail with the understanding that the description of first coupling assembly 166 applies to second coupling assembly 168. First coupling assembly 166 includes a coupling mechanism 170 and a biasing member 172. Coupling mechanism 170 includes a bolt 174, a washer 176, and a nut 178. Bolt 174 includes a head 180 having a shank 182 extending therefrom. Head 180 extends axially outwardly from a first end of an aperture 184 in output shaft 132. An opposite end 186 of bolt 174, generally opposite head 180, extends axially inwardly from a second end of aperture 184 into chamber 142. Washer 176 is disposed between head 180 and biasing member 172 and may be engaged with biasing member 172.

Second end 186 of bolt 174 includes a threaded portion 188 for engagement with nut 178. Nut 178 includes a generally cylindrical body having first and second portions 190, 192 at opposite ends thereof. First portion 190 may be in splined engagement with first side gear 162 and spaced apart from an end 194 of output shaft 132. Second portion 192 forms a flange extending radially outwardly relative to first portion 190. Second portion 192 of nut 178 abuts first side gear 162 and urges first side gear 162 axially outwardly toward a thrust washer 196. The force applied to first side gear 162 by nut 178 may be determined by the axial location of head 180 and the characteristics of biasing member 172.

As previously described, first coupling assembly 166 may be adjustable to provide a variable preload force urging first side gear 162 into engagement with thrust washer 196 and, therefore, housing assembly 124. The preload force may be adjusted by varying the installed length of biasing member 172. The installed length of biasing member 172 may be adjusted by rotating bolt 174 while in threaded engagement with nut 178.

Planetary gearset 130 also includes a set of first helical pinions 200 journally supported in first gear pockets 202 formed in drum housing 140 and a set of second helical pinions 204 journally supported in second gear pockets 206 formed in drum housing 140. While not limited thereto, differential 110 is shown to include two each of first pinions 200 and second pinions 204 arranged in meshed pairs, referred to as meshed pinion sets. Gear pockets 202 and 206 are elongated, longitudinal, partially cylindrical bores and are formed in paired overlapping sets such that they both communicate with chamber 142. In addition, gear pockets 202 and 206 are equidistant and circumferentially aligned so as to define pinion rotary axes "B" for first pinions 200 and rotary axes "C" for second pinions 204 that are parallel to the rotary axis "A" of housing assembly 124 and output shafts 132 and 134. First gear pockets 202 are bores that extend from an end wall of drum housing 140 and which terminate with a radial end surface 210. Similarly, second gear pockets 206 are bores that extend from the end wall of drum housing 140 and which terminate with a radial end surface 212. When end cap 144 is installed on drum housing 140, its inner face surface 214 encloses the open ends of pockets 202 and 206. First pinions 200 are shown to include a long, larger diameter gear segment 200a and a short, smaller diameter stub shaft segment 200b. When installed in first gear pockets 202, first pinions 200 are arranged such that the teeth of gear segments 200a are meshed with the teeth of side gear 162 while their outer diameter tooth end surfaces are journally supported by the bearing wall surface of pockets 202.

Likewise, second pinions 204 are shown to include a long, larger diameter gear segment 204a and a short smaller diameter stub shaft 204b. When installed in second gear pockets 206, second pinions 204 are arranged such that the teeth of gear segments 204a are meshed with the teeth of side gear 164 while their outer diameter tooth end surfaces are journally supported by the bearing wall surface of second gear pockets 206. Since pinions 200 and 204 are arranged in meshed sets, gear segment 200a of one of first pinions 200 also meshes with gear segment 204a of a corresponding one of second pinions 204. Preferably, gear segments 200a and 204a are of an axial length to effectively maintain meshed engagement substantially along their entire length.

Planetary gearset 130 is equipped with an optional pinion gear alignment mechanism which functions to support stub shaft segments 200b on each of first pinions 200 against the bearing wall surface of its corresponding first gear pocket 202 and against the outer diameter tooth end surfaces of side gear 164 and gear segment 204a of its meshed second pinion 204. The alignment mechanism is similarly employed to support stub shaft segment 204b on each of second pinions 204 against the bearing wall surface of its corresponding second gear pocket 206 and against the outer diameter tooth end surfaces of side gear 162 and gear segment 200a of its meshed first pinion 200. By supporting shaft segments 200b and 204b in this manner, pinions 200 and 204 are supported substantially along their entire length in gear pockets 202 and 206, thereby substantially minimizing or preventing angular misalignment of the pinions relative to their rotary axes.

The alignment mechanism includes a set of support members, hereinafter referred to as brake shoes 220, that are mounted on pinion stub shaft segments 200b, 204b prior to installation of pinions 200, 204 into gear pockets 202, 206. Alternatively, brake shoes 220 can be inserted into gear pockets 202, 206 prior to installation of pinions 200, 204 therein. Brake shoes 220 include an axial aperture 222 that is sized to journally support pinion shaft segments 200b and 204b while limiting radial deflection thereof. Each brake shoe 220 has a first support surface 224, a second support surface 226, and a third support surface 228. First support surface 224 is arcuate and is configured to rotationally support the outer diameter tooth end surface of the corresponding one of side gears 162 and 164. Second support surface 226 is arcuate and is configured to rotationally support the outer diameter tooth end surface of corresponding pinion gear segment 200a, 204a. Finally, third support surface 228 is arcuate and is configured such that it is supported by the complimentary bearing wall surface of the corresponding gear pocket 202, 206. Thus, any radial movement of side gears 162, 164 and/or pinion gear segments 200a, 204a relative to brake shoes 220 will result in frictional engagement therebetween which generates a braking force for limiting speed differentiation therebetween. This braking feature also results in increased torque bias for differential 110. Brake shoes 220 have an axial length selected to support stub shafts 200b, 204b substantially along their entire length while permitting limited axial sliding movement of brake shoes 220 in gear pockets 202, 206 relative to the pinions. Under normal circumstances, this lateral clearance prevents binding of the pinions. However, axial movement of the pinions due to thrust loads will cause frictional engagement between face surfaces 230 and 232 of brake shoes 220 and adjacent pinion end surfaces 200c and 204c, thereby increasing the torque bias ratio of differential 110.

It should also be appreciated that while two coupling assemblies are shown and described, it is contemplated that a limited slip differential assembly according to the present disclosure may include only one coupling assembly. Furthermore, load producing devices other than the compression springs depicted in the figures may be implemented. For example, Belleville washers, torsion springs or elastomeric structures may be implemented.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A vehicle differential assembly, comprising:
   a differential housing rotatable about an axis;
   a first output assembly including a first side gear and a first output member, said first side gear disposed within said differential housing and being rotatable about said axis, said first output member coupled to said first side gear for rotation therewith;
   a second output assembly including a second side gear and a second output member, said second side gear being disposed within said differential housing and rotatable about said axis, said second output member coupled to said second side gear for rotation therewith;
   a helical pinion gear pair disposed within said differential housing and having a first helical pinion gear engaged with said first side gear and a second helical pinion gear engaged with said second side gear and said first helical pinion gear; and
   a first coupling assembly engaged with said first output assembly and including a coupling mechanism and a biasing member, said coupling mechanism extending through an opening in said first output member and being displaceable relative to said differential housing in a direction generally parallel to said axis, said biasing member engaged with said coupling mechanism and urging at least one of said first side gear and said first output member into frictional engagement with said differential housing.

2. The vehicle differential assembly of claim 1 wherein said coupling mechanism is displaceable between first and second axial positions to provide first and second preloads on one of said first side gear and said first output member, said first preload providing a greater frictional engagement than said second preload.

3. The vehicle differential assembly of claim 1 wherein said biasing member urges said coupling mechanism in a direction generally parallel to said axis and axially outwardly relative to said differential housing.

4. The vehicle differential assembly of claim 1 wherein said coupling mechanism includes a bolt and a nut, said bolt including a head and a distal end including a thread, said head extending axially outwardly from a first end of said opening in said first output member and said nut being disposed within said differential housing at a second end of said opening in said first output member, said nut being threadingly engaged with said distal end of said bolt and urging said one of said first side gear and said first output member into said frictional engagement with said differential housing.

5. The vehicle differential assembly of claim 4 wherein said biasing member is disposed axially between said head of said bolt and said first end of said opening in said first output member.

6. The vehicle differential assembly of claim 4 wherein said bolt is axially displaceable relative to said first output member.

7. The vehicle differential assembly of claim 4 wherein said first side gear is fixed for rotation with said nut.

8. The vehicle differential assembly of claim 1 further comprising a second coupling assembly engaged with said second output assembly and including a second coupling mechanism and a second biasing member, said second coupling mechanism extending through an opening in said second output member and being displaceable relative to said differential housing in a direction generally parallel to said axis, said second biasing member engaged with said second coupling mechanism and urging at least one of said second side gear and said second output member into a frictional engagement with said differential housing.

9. The vehicle differential assembly of claim 8 wherein said first coupling assembly is independently adjustable from said second coupling assembly.

10. The vehicle differential assembly of claim 1 wherein said first coupling mechanism includes a preload adjustment member disposed outside of said differential housing.

11. The vehicle differential assembly of claim 10 wherein said preload adjustment member is rotatable in a first direction to increase said frictional engagement between said one of said first side gear and said first output member and said differential housing.

12. The vehicle differential assembly of claim 11 wherein said preload adjustment member is rotatable in a second direction opposite said first direction to reduce said frictional engagement between said one of said first side gear and said first output member and said differential housing.

13. The vehicle differential assembly of claim 1 wherein said coupling mechanism extends longitudinally along said axis.

14. A vehicle differential assembly, comprising:
   a differential housing rotatable about an axis;
   a first output assembly including a first side gear and a first output member, said first side gear disposed within said differential housing and being rotatable about said axis, said first output member coupled to said first side gear for rotation therewith and having an aperture aligned with said axis;
   a second output assembly including a second side gear and a second output member, said second side gear disposed within said differential housing and being rotatable about said axis, said second output member coupled to said second side gear for rotation therewith;
   first and second helical pinion gears disposed within said differential housing, said first helical pinion gear meshingly engaged with said first side gear, said second helical pinion gear meshingly engaged with said second side gear and said first helical pinion gear; and
   a first coupling assembly engaged with said first output assembly and including a coupling mechanism and a biasing member, said biasing member biasing said first output assembly into frictional engagement with said differential housing, said coupling mechanism being disposed in said aperture and including an adjustment member that is displaceable relative to said first output member to vary a load applied by said biasing member.

15. The vehicle differential assembly of claim 14 wherein said adjustment member is disposed outside of said differential housing.

16. The vehicle differential assembly of claim 14 wherein said adjustment member is displaceable to provide a first installed length of said biasing member for providing a first preload and a second installed length of said biasing member for providing a second preload that is less than said first preload.

17. The vehicle differential assembly of claim 16 wherein said adjustment member is rotatable in a first rotational direction to provide said first installed length.

18. The vehicle differential assembly of claim 17 wherein said adjustment member is rotatable in a second rotational direction to provide said second installed length.

19. The vehicle differential assembly of claim 14 wherein said first coupling mechanism includes a bolt and wherein said adjustment member is a head at a first end of said bolt.

20. The vehicle differential assembly of claim 19 wherein said coupling mechanism includes a nut threadingly engaged with a second end of said bolt generally opposite said first end, said nut abutting said first side gear and urging said first side gear into said frictional engagement with said differential housing.

21. The vehicle differential assembly of claim 14 further comprising a second coupling assembly engaged with said second output assembly and including a second coupling mechanism and a second biasing member, said second biasing member biasing said second output assembly into frictional engagement with said differential housing, said second coupling mechanism is disposed in an aperture formed in said second output member and includes a second adjustment member that is displaceable relative to said second output member to vary a load applied by said second biasing member.

22. A vehicle differential assembly, comprising:
a differential housing having a body portion defining a central cavity and first and second end portions defining first and second openings communicating with said central cavity, the differential housing being rotatable about an axis;
at least one pair of constantly meshed helical pinion gears rotatably supported by said body portion and at least partially positioned within said central cavity, the pinion gears rotating about axes extending substantially parallel to said differential housing axis of rotation;
a first side gear in constant meshed engagement with one of said pinion gears;
a second side gear in constant meshed engagement with the other of said pinion gears;
a first output shaft extending through said first opening in said differential housing and having a first end and a second end, said first end is located within said central cavity and is coupled for common rotation with said first side gear, and said second end is located outboard of said first end portion of said differential housing;
a second output shaft extending through said second opening in said differential housing and having a first end and a second end, said first end is located within said central cavity and is coupled for common rotation with said second side gear, and said second end is located outboard of said second end portion of said differential housing; and
a coupling assembly for biasing said first side gear into frictional engagement with said differential housing and including a coupling mechanism and a biasing mechanism, said coupling mechanism extending through an aperture in said first output shaft and having a first segment engaging at least one of said first side gear and said first end of said first output shaft and a second segment located adjacent to said second end of said first output shaft, said biasing mechanism is disposed between said second segment of said coupling mechanism and said second end of said first output shaft.

23. The vehicle differential assembly of claim 22 wherein said coupling mechanism includes a bolt and a nut, said nut is disposed in said central cavity between said pinion shaft and said first end of said first output shaft and engages at least one of said first side gear and said first end of said first output shaft, said bolt has a shank portion extending through said aperture in said first output shaft, a threaded portion engaging said nut, and a head portion located adjacent to said second end of said first output shaft, and wherein said biasing mechanism includes a washer surrounding said shank portion adjacent to said head portion and a biasing spring disposed between said washer and said second end of said first output shaft.

24. The vehicle differential assembly of claim 23 wherein said bolt is axially displaceable relative to said nut for permitting adjustment of the biasing force exerted by said biasing spring.

25. The vehicle differential assembly of claim 23 wherein said nut has a radial flange portion engaging said first side gear.

26. The vehicle differential assembly of claim 23 wherein said first side gear is splined to at least one of said first end of said first output shaft and said nut.

27. The vehicle differential assembly of claim 22 further comprising a second coupling assembly for biasing said second side gear into frictional engagement with said differential housing and including a second coupling mechanism and a second biasing mechanism, said second coupling mechanism extending through an aperture in said second output shaft and having a first segment engaging at least one of said second side gear and said first end of said second output shaft and a second segment located adjacent to said second end of said second output shaft, said second biasing mechanism is disposed between said second segment of said second coupling mechanism and said second end of said second output shaft.

28. The vehicle differential assembly of claim 27 wherein said first coupling assembly is adjustable to vary the frictional engagement between said first side gear and said differential housing, and wherein said second coupling mechanism is adjustable to vary the frictional engagement between said second side gear and said differential housing independent of said first coupling assembly.

29. The vehicle differential assembly of claim 22 wherein said coupling mechanism is axially moveable relative to said differential housing for causing said biasing member to apply a preload force on said first side gear relative to said differential housing.

30. The vehicle differential assembly of claim 22 wherein said coupling assembly further includes a preload adjustment member associated with said second segment of said coupling mechanism that is operable to selectively vary the biasing force exerted by said biasing member.

31. The vehicle differential assembly of claim 22 further including a thrust bearing disposed between said first end portion of said differential housing and said second end of said first output shaft.

* * * * *